United States Patent [19]

Duschl

[11] Patent Number: 4,575,751
[45] Date of Patent: Mar. 11, 1986

[54] METHOD AND SUBSYSTEM FOR PLOTTING THE PERIMETER OF AN OBJECT

[75] Inventor: Robert A. Duschl, Lancaster, Pa.

[73] Assignee: RCA Corporation, Princeton, N.J.

[21] Appl. No.: 551,920

[22] Filed: Nov. 15, 1983

[51] Int. Cl.<sup>4</sup> ............................................. H04N 7/18
[52] U.S. Cl. .................................. 358/106; 356/394; 358/107; 358/213; 377/24; 382/22
[58] Field of Search ............... 358/93, 101, 106, 107, 358/213; 364/560, 561, 562, 563, 564; 356/392, 393, 394; 382/22; 377/24

[56] References Cited

U.S. PATENT DOCUMENTS

| | | | |
|---|---|---|---|
| 3,781,574 | 12/1973 | White et al. | 307/304 |
| 4,276,609 | 6/1981 | Patel | 364/900 |
| 4,351,004 | 9/1982 | Choate et al. | 358/213 |
| 4,454,541 | 6/1984 | Duschl | 358/106 |
| 4,454,545 | 6/1984 | Duschl | 358/106 |
| 4,480,264 | 10/1984 | Duschl | 358/107 |

Primary Examiner—Howard W. Britton
Attorney, Agent, or Firm—E. M. Whitacre; D. H. Irlbeck; L. L. Hallacher

[57] ABSTRACT

The perimeter of an object is detected using a CCD. When a pixel is dark a right detection turn is taken and when a pixel is light a left detection turn is taken. When a transition from light to dark or from dark to light occurs the address of the light pixel is recorded to identify the light pixel as a perimeter pixel.

14 Claims, 5 Drawing Figures

METHOD AND SUBSYSTEM FOR PLOTTING THE PERIMETER OF AN OBJECT

BACKGROUND OF THE INVENTION

This invention relates generally to a subsystem and method for detecting and plotting the perimeter of an object being inspected with a system using a charge coupled device (CCD) as the detection element and particularly to such a subsystem and method for detecting and plotting the perimeters of the phosphor screens on kinescope panels.

U.S. application Ser. No. 388,143 entitled "CHARGE COUPLED DEVICE BASED INSPECTION SYSTEM AND METHOD" filed June 14, 1982 by Robert A. Duschl, now U.S. Pat. No. 4,454,545, discloses an inspection system employing a CCD. The system is very versatile and permits replacing the CCD with a CCD having different characteristics, such as different numbers of rows and columns of pixels or which is responsive to a different type of energy. When a CCD is replaced, the numbers of rows and columns of pixels of the replacement CCD are set into the system and the waveform generator is reset in accordance with the transfer characteristics of the replacement CCD. The system is then ready for use with the replacement CCD.

U.S. application Ser. No. 388,038 entitled "CHARGE COUPLED DEVICE BASED BLEMISH DETECTION SYSTEM AND METHOD" filed June 14, 1982 by Robert A. Duschl, now U.S. Pat. No. 4,454,541, discloses a system and method for detecting blemishes on the screen of a kinescope. Blemishes are detected by comparing the signal on each CCD pixel with the average of the signals on the immediately adjacent pixels and generating a blemish signal when the difference exceeds a predetermined threshold.

U.S. application Ser. No. 388,029 entitled "CHARGE COUPLED DEVICE BASED SYSTEM AND METHOD FOR MEASURING PROJECTED FIGURES" filed June 14, 1982 by Robert A. Duschl, now U.S. Pat. No. 4,480,264, describes a system for measuring figures projected onto a CCD. The data from a number of adjacent pixels in a particular line is summed, and the summed signal is divided by a maximum signal to provide a mean pixel signal which is multiplied by a dimension per pixel value to provide a dimensional signal representative of the dimension being measured.

U.S. application Ser. No. 388,037 entitled "CHARGE COUPLED DEVICE BASED SYSTEM AND METHOD FOR INSPECTING AND MODIFYING IMAGES" filed June 14, 1982 by Robert A. Duschl describes a system employing a CCD for inspecting or modifying images. An image of the device being inspected is cast onto a CCD and compared with a reference image to identify and locate faults in the object. The disclosures of these applications are incorporated by reference herein.

The systems described in the above-referenced applications operate quite satisfactorily for the purposes intended. However, optimization of efficiency when using the systems results in the need for the ability to accurately identify the perimeters of the objects being investigated irrespective of the dimensions and orientation of the objects. For example, in utilizing the blemish detection system described in U.S. application Ser. No. 388,038, the faceplate of a kinescope is accurately positioned and oriented in an inspection system employing a CCD and a camera. Light is passed through the screen of the faceplate panel to charge the CCD pixels to various levels. The pixel charge levels are processed to determine the presence of a blemish within the screen. Prior to processing the individual pixel charge levels, the perimeter of the kinescope screen is synthesized by generating an "electronic mask" around the perimeter of the phosphor screen being inspected. This perimeter generation results in several disadvantages. First, the panel must be accurately oriented in the inspection system and the size of the panel being inspected must be known. Additionally, because of the generation of the electronic mask the pixels in the proximity of the edge of the screen being inspected cannot be considered because they are masked out by the electronic mask.

The instant invention overcomes the above-noted deficiencies by the provision of a subsystem and method for detecting and plotting the perimeter of an object irrespective of the orientation and size of the object.

SUMMARY

A subsystem for detecting and plotting the perimeters of objects imaged onto a CCD irrespective of the size and orientation of the objects includes means for sequentially detecting the charge level on adjacent pixels in a substantially straight line of the CCD until the charge level changes from a first level to a second level for a preselected number of consecutive pixels. Detection is backed up for the preselected number of pixels and the address of the pixel preceeding the pixel where the charge level change occurred is recorded as a start address. The charge level on individual adjacent first and second pixels is detected. The second detection occurs on a second pixel disposed from the first pixel in one direction when the level of the first pixel is the first level and the second detection occurs on a second pixel displaced from the first pixel in an opposite direction when the level of the first pixel is the second level. The address of the second pixel is stored when the second pixel level is the first level, and the address of the first pixel is stored when the second pixel level is the second level.

DETAILED DESCRIPTION

Figure 1:
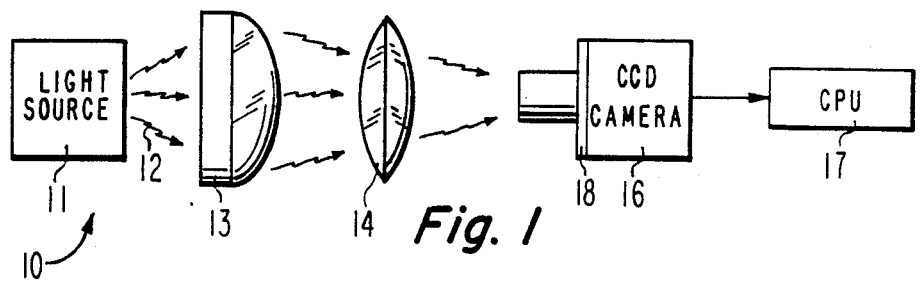
FIG. 1 is a simplified showing of a CCD based inspection system.

FIG. 1 shows a CCD based inspection system 10 which preferably is of the type described in U.S. application Ser. No. 388,143, now U.S. Pat. No. 4,454,545, and which can include the blemish detection system described in U.S. application Ser. No. 388,038, now U.S. Pat. No. 4,454,541, both of which are fully referenced hereinabove. The inspection system 10 includes a light source 11 the light rays 12 of which fully illuminate a phosphor screen present on the inside surface of a kinescope panel 13. The light rays 12 pass through the phosphor screen and are focused by a lens 14 onto the CCD 18 within a CCD camera 16. Each pixel of the CCD in the camera 16 is charged to a particular level depending upon the amount of light received by the individual pixels. Thus, the light passing through the phosphor screen on the surface of the panel 13 determines the charge level of each pixel. The pixel data are transferred from the CCD 18 to a central processing unit 17 and processed in accordance with the inspection being made. Thus, the inspection can be the detection of blemishes on the screen of the panel 13, the measurement of the object from which the light rays are directed to the CCD or any of the other inspections described in the above-referenced applications, for example.

Figure 2:
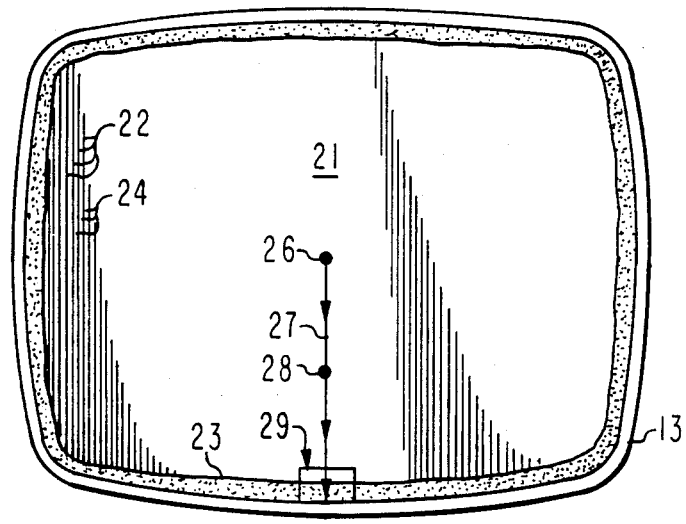
FIG. 2 shows the dark edge of the phosphor screen present on the inside surface of the panel of a kinescope.

FIG. 2 shows the inside surface of the panel 13. As is known from those skilled in the art, the screen 21 of the kinescope panel includes a black matrix which is composed of a plurality of parallel black lines 22 and a perimeter 23. The parallel lines 22 extend across the entire surface of the screen 21 and only several are shown in FIG. 2 for simplicity. Phosphors are arranged in the spaces 24 between the matrix lines 22 in a sequential fashion and each phosphor emits a different color light when impacted by electrons. Thus, the phosphors are arranged in a repetitive pattern such as red, green and blue across the entire surface of the screen 21.

In operation of the system 10 of FIG. 1, light is passed through, or reflected from, the object being inspected and the individual pixels of the CCD 18 within the CCD camera 16 are charged to various levels in accordance with the amount of light received by the individual pixels. The data are transferred from the CCD pixels to the central processing unit 17 where the signal for each pixel is stored at an individual address. Irrespective of the inspection being performed, and irrespective of the nature of the object being inspected, the maximization of efficiency of the data processing requires the identification of the perimeter of the object. Such identification avoids processing data from the pixels which do not receive energy from the object and thus eliminates the processing of extraneous information. Thus, when the object being inspected is the screen 21 on the inside surface of the kinescope panel 13, it is necessary to detect the perimeter 23 of the black matrix. Substantially more light passes through the lighter colored phosphor stripes than the black matrix perimeter 23. Accordingly, the pixels receiving light from the phosphors charge to a higher level than the pixels receiving light from the black matrix. Typically, the matrix lines 22 are reduced in width by the lens 14. These lines, therefore, are not visible to the CCD 18. Also, if desired, the camera 16 can be slightly defocussed to conceal the matrix lines 22. The inspection is commenced by detecting the charge level of a CCD pixel which is known to be somewhere in the vicinity of the center of the object being inspected. In FIG. 2, this location is identified as the point 26. The detection proceeds along a selected column (or row) of pixels of the CCD. In FIG. 2, such detection occurs along the line 27 of the screen 21. The charge on each successive pixel within the CCD column or row is considered to determine whether a change in charge level which signifies an energy intensity change occurs. When such a change occurs, the next pixel in the selected column is considered to determine whether or not its charge level is the same as the changed charge level. The successive detection of the pixel charges within the selected column continues until the changed level is present on a preselected number of consecutive pixels, such as five, when it is known that the periphery 23 of the object has been detected. Detection of the pixel charge levels is then backed up the preselected number of pixels to the pixel where the transition from the screen 21 to the perimeter 23 was made. The immediately preceeding pixel is identified as the start pixel. Detection is the incremented one CCD pixel column to the left from the direction of detection and the process repeated to identify a stop pixel. The pixels along the entire perimeter of the object are detected to accurately plot the entire perimeter.

Because the pixel charge level change must occur for a preselected number of consecutive pixels before the presence of the periphery 23 is indicated, several distinct advantages are realized. For example, a blemish represented by the spot 28 of FIG. 2 cannot falsely indicate the presence of the perimeter because a blemish spanning the preselected number of pixels would be very large and result in a visual rejection of the panel. Additionally, the perimeter 23 can be detected and plotted irrespective of the orientation of the object within the inspection system and irrespective of the size of the object. Also, the pixels immediately adjacent to the perimeter 23 are considered because no pixels are masked out using an "electronic mask" to simulate the perimeter.

Figure 3:
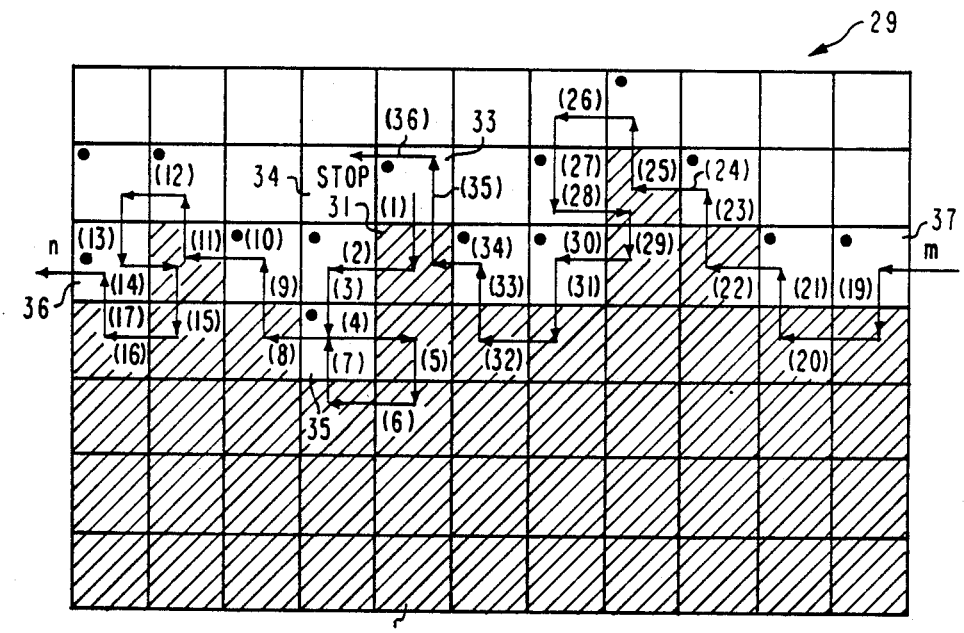
FIG. 3 is an enlarged portion of the screen perimeter of FIG. 2 showing how the pixels along the perimeter are sequentially considered to detect the perimeter.

FIG. 3 is a greatly magnified view of the rectangular portion 29 containing a portion of the screen 21 and the black matrix periphery 23 of FIG. 2. In FIG. 3, the rectangular portion 29 is divided into small squares to represent the pixels of the CCD 18. The pixels which are coincident with the periphery 23 of the black matrix receive less light than those energized by light passing through the screen 21 and thus are charged to a lower level. These pixels are represented by the cross hatched squares in FIG. 3. In FIG. 3, detection along the line 27 has occurred until a pixel charge level from high on the screen to low on the periphery 23 occurs at the cross hatched pixel 31. Detection continues along the same column of pixels of the CCD until pixel 32 is reached and the preselected number of, five, consecutive pixels have shown the dark intensity charge level. At this point, detection is backed up to pixel 31. Pixel 33 is the pixel having the light intensity charge level which is adjacent to the dark pixel 31. The pixel 33 is marked as the perimeter of the screen 21, such marking is indicated by the dot in the upper left-hand corner and such indication is carried out throughout the description. The address of the pixel 33 is recorded as the start address of the perimeter identification and plotting process. The detection is then incremented one CCD pixel column to the left and the process repeated to record the address of the stop pixel. In FIG. 3, pixel 40 thus is identified as the stop pixel. Although in FIG. 3 five dark pixels do not follow pixel 40 this is because of space limitations in the drawings. In actual practice, the perimeter 23 typically is 15 to 20 pixels wide. After stop pixel 40 is recorded, start pixel 33 is readdressed and the perimeter plotting process begins. When the stop pixel address is reached, the entire perimeter 23 has been identified and plotted and the detection process is complete. The entire perimeter 23 around the panel 13 (or other object) is detected and plotted by following four fundamental criteria:

1. When a dark pixel is detected, a right turn from the direction of detection is taken. In FIG. 3, the direction of detection is represented by the parenthetically numbered arrows.

2. When a light pixel is detected, a left turn from the direction of detection is taken.

3. When a dark pixel is detected and the immmediately preceding pixel was light, the edge of the perimeter 23 is identified by recording the address of the preceding light pixel.

4. When a light pixel is detected and the immediately preceding pixel was dark, the edge of the perimeter 23 is identified by recording the address of the detected light pixel.

As stated in criteria number 1, a right turn is taken from a dark pixel. For this reason, the stop pixel 40 is located to the left of the start pixel 33. The turn directions can be reversed and the stop pixel would then be located to the right of the start pixel.

The manner in which these fundamental steps are used to plot the edge of the perimeter 23 of FIG. 2 can be understood from FIG. 3. The arrows in FIG. 3 represent the direction of detection from one pixel to the next pixel. The parenthetical numbering of the arrows shows the sequence of detection for the example shown in FIG. 3. Five dark pixels, including pixels 31 and 32 as the first and last respectively, immediately follow pixel 33. When these five pixels are detected and when five is the preselected number, detection is backed up to pixel 31 and pixel 33 is identified as the start pixel by setting the address of this pixel into the CPU 17 (FIG. 1). Detection is the incremental one CCD pixel column to the left, from the direction of detection, and the process reported to set the address of stop pixel 40 into the CPU 17. Start pixel 33 is readdressed and detection incremented to pixel 31. Because pixel 31 is a dark pixel, a right turn from the arrow numbered (1) is taken and detection in the direction indicated by arrow (2) proceeds to the adjacent pixel. This pixel is light and the preceeding pixel is dark. Accordingly, criteria number 4 is met and the pixel is identified as a perimeter pixel by storing the address of the pixel in the CPU 17. Also, detection of the next pixel 35 occurs to the left, as indicated by arrow (3). Pixel 35 is light; however, the preceeding pixel also is light and therefore criteria number 4 is not met and the pixel is not recorded as a perimeter pixel at this time. Detection from pixel 35 to the next pixel occurs to the left as indicated by arrow (4). The pixel is dark and a transition from light to dark has occurred, criteria number 3 therefore is met and the address of the preceeding pixel 35 is recorded as a perimeter identifying pixel. Thus, in FIG. 3, the numbering of the arrows from (1) to (17) shows the sequence of right and left turns along the perimeter 23 until pixel 36 at the left edge is reached when, as indicated by the arrow identified (n), rectangle 29 of FIG. 2 is exited. Detection continues around the perimeter 23 until pixel 37 at the right side of the rectangle 29 is detected, as indicated by the arrow identified as (m). Pixel 37 is light and a left turn along arrow (19) is taken. Detection continues along the perimeter 23 as shown by the arrows numbered (19) to (33) until the stop pixel 40 is reached and the detection process stops. In FIG. 3, the light pixels along the perimeter 23 of the black matrix border are indicated by a small dot in the upper left-hand corner the addresses of these are the pixels recorded to identify the perimeter 23 as either criteria 3 or 4 is met.

Figure 4A:
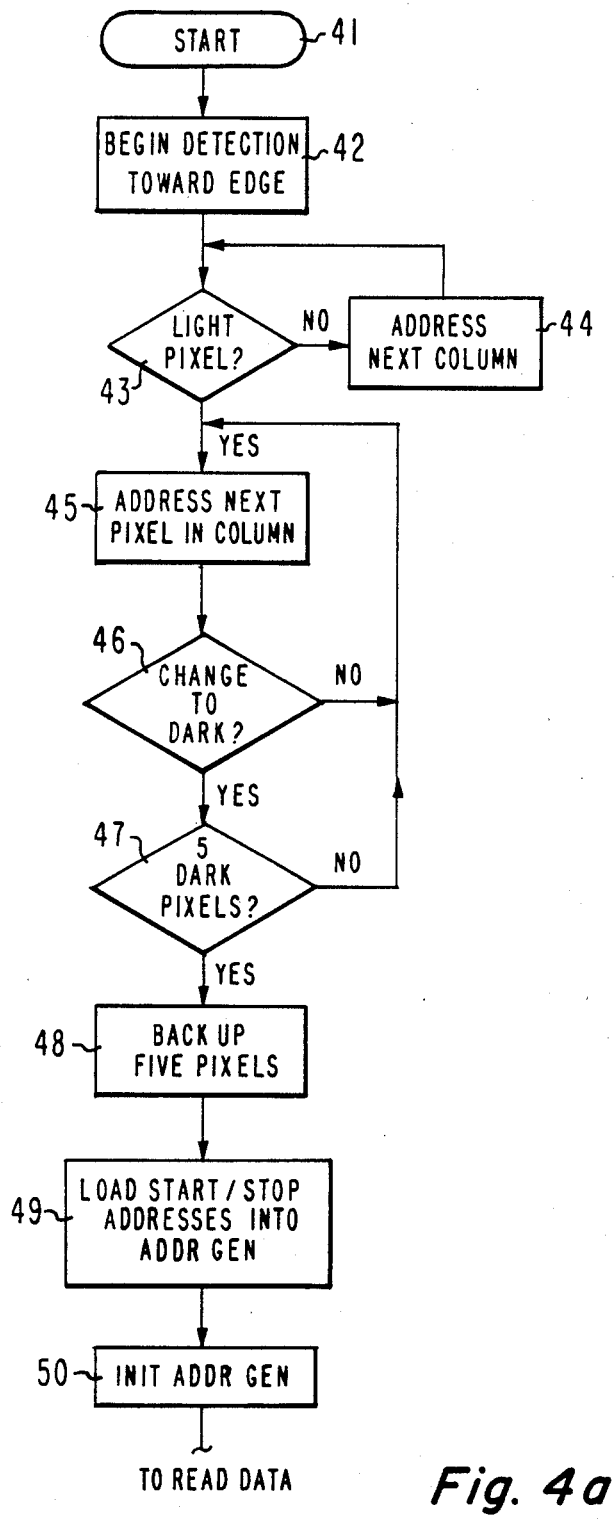
FIG. 4, consisting of FIG. 4a and FIG. 4b, is a preferred embodiment of a subsystem for effecting the sequential consideration of the pixel information shown in FIG. 3.
Figure 4B:
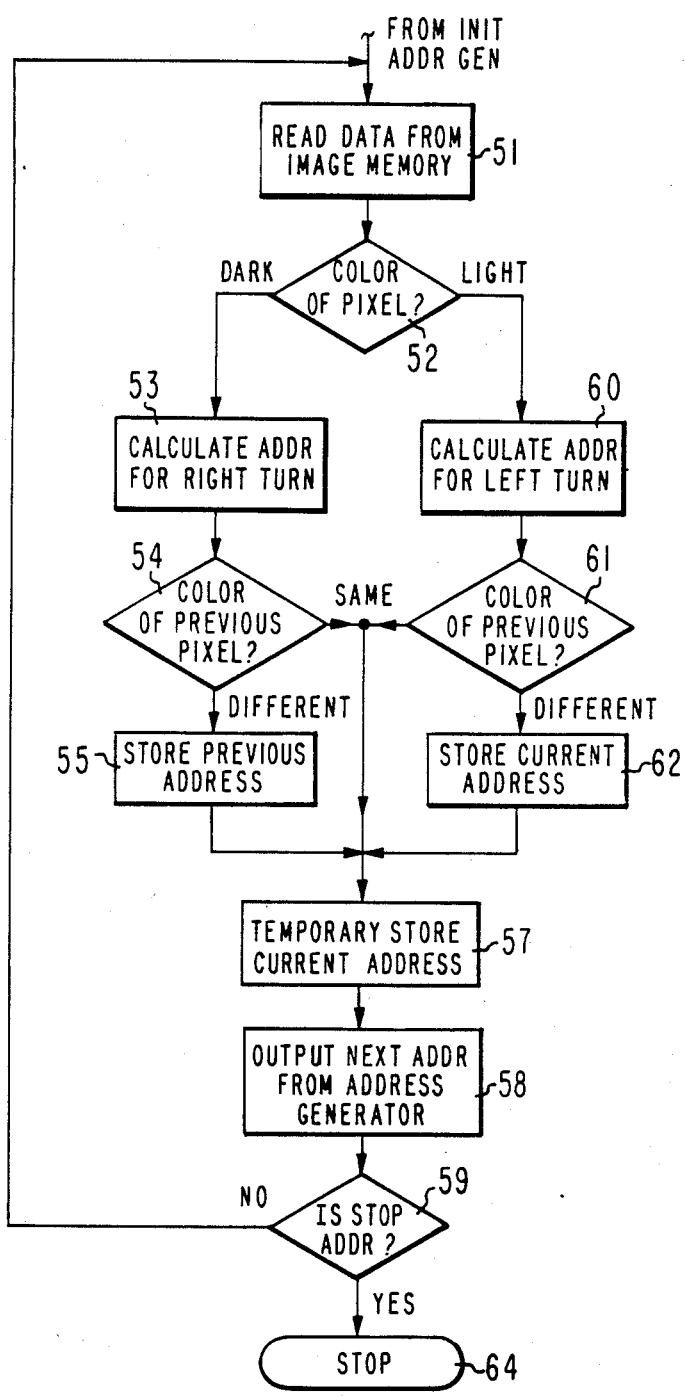

The flow chart of FIGS. 4a and 4b is a preferred embodiment of a subsystem for effecting the detection and plotting described with respect to FIG. 3. In FIG. 4a, at functions 41 and 42, detection toward the perimeter 23 begins, this is represented by the line 27 of FIG. 2. At decision function 43, a determination is made as to whether or not start point 26 of FIG. 2 begins on a light pixel. When the answer is no, function 44 is entered to address the next column of pixels within the CCD array. The steps 43 and 44 are taken to assure that the start pixel which is aligned with the start point 26 is not coincident with an opaque portion of the object being inspected. When the start point 26 is coincident with an opaque portion of the object, a pixel within a column immediately adjacent to the column containing the originally detected pixel is addressed until a light pixel is detected. When a light pixel is detected, at decision function 43, function 45 is entered to address the next pixel in the column. This action is comparable to moving one pixel along the line 27 of FIG. 2. When the object being inspected is the panel of a kinescope, the matrix lines 22 are not visible to the CCD and steps 43 and 44 can be eliminated. At decision function 46, a decision is made as to whether or not the detected pixel has changed from light to dark. When the answer is no, a return is made to function 45 to address the next pixel in the column. When the answer is yes, decision function 47 is entered to determine whether or not the preselected number of consecutive dark pixels have been detected. When the answer is no, the decision function 45 is returned to address the next pixel. This operation prevents small opaque portions of the object being inspected, or small blemishes on the object from giving a false indication of the perimeter 23. At decision function 47 when the preselected number of consecutive pixels are detected, such as the five pixels including pixels 31 and 32 in FIG. 3, the perimeter 23 has been reached. At this point, function 48 is entered and the detection is backed up five pixels, for example to pixel 31 in FIG. 3. Function 49 is next entered to load the address of the preceeding light pixel as the start pixel, for detection around perimeter 23. In FIG. 3 is the pixel immediately preceeding the first dark pixel 31 is pixel 33 and thus pixel 33 is entered as the start pixel. The pixel coincident with the point 26 (FIG. 1) is returned to and detection is incremented one pixel column on the CCD. The entire process is repeated to set the address of the stop pixel into the CPU 17. The stop pixel is the pixel at which perimeter detection stops after the entire perimeter 23 has been identified and plotted.

After the start and stop pixels addresses are loaded, the address generator is initialized at function 50 and the data are read from the image memory at function 51, FIG. 4b. Decision function 52 is entered to determine the signal level of the pixel, that is, whether the pixel is dark or light. When the pixel is dark, function 53 is entered to calculate the address for a right turn. In FIG. 3, this turn is represented by the arrow (2) extending from pixel 31 to the immediately adjacent light pixel. Decision function 54 is then entered to determine whether or not the latest detected pixel is different in level from the previously detected pixel. When the level is the same as that of the previously detected pixel, the temporary store address function 57 is entered and the pixel address is temporarily stored so that the level is available for comparison with the level of the next pixel detected. However, the pixel is not marked as a perimeter pixel because the perimeter 23 has not been detected and neither criteria 3 nor 4 is met. Function 58 is entered to output the address of the next pixel to be detected from the address generator and when the stop pixel 40 has not been detected at function 59, the routine returns to function 51 to read the data from the image memory for the next pixel.

Referring again to decision function 54, when the detected pixel is dark and the preceeding pixel was light, criteria 3 is met. Function 55 is entered to store the address of the previous light pixel which marks the light pixel as a perimeter pixel.

Referring again to decision function 52 in FIG. 4b, when a light pixel is detected function 60 is entered to calculate the address needed for a left turn. Decision function 61 is entered to determine whether or not the level of the previous pixel is the same as the level of the detected pixel. When the levels are the same functions 57 and 58 are entered to temporarily store the pixel data for comparison with the next pixel and to output the next address from the address generator. Function 59 is entered to determine whether or not the stop address has been detected and to return to function 51 when it has not. Referring again to decision function 61, when the previous pixel was dark, criteria 4 is met and function 62 is entered to store the address of the currently detected pixel and thus mark the pixel as a perimeter pixel. Functions 57, 58 and 59 are entered to return to function 51 and increment to the next pixel to be detected. This operation continues completely around the perimeter 23 of the object until the address of stop pixel 40 (FIG. 3), which has been recorded as the stop address, is encountered and stop function 64 is entered to stop the detection and plotting process.

Thus, the entire perimeter 23 of the black matrix present on the panel 13 of FIG. 2 can be detected by making the appropriate right and left turns as pixels having different charge levels are encountered around the perimeter. By following the parenthetical numbering on the arrows in FIG. 3, the manner in which right and left turns lead around the parameter of the matrix can be followed and readily understood. It has been found that this technique permits the complete perimeter of the matrix on a 25 V kinescope panel to be detected in less than half a second. This is a marked advance over the electronic mask technique previously used where several seconds are required to generate the electronic mask. Additionally, the inventive system permits the detection of the actual perimeter and thus enlarges the area where blemishes can be detected because no portion of the screen is blanked out by the electronic mask. Also, the perimeter is initially identified by the consecutive detection of five dark pixels. Accordingly, the panel size need not be set into the system and the orientation of the panel is not important.

Although the invention has been described with respect to a particular application, it should be appreciated that the invention can be used to detect and plot the perimeters of a wide variety of objects and, accordingly, the scope of the invention is not limited to the application described. For example, the invention can be used in the inspection of integrated circuits, printed circuits, photographic art work for the acid etching of thin metal parts, and other uses.

What is claimed is:

1. In a system for inspecting objects using a charge coupled device having a plurality of pixels and a central processing unit, the improvement comprising:
a subsystem for detecting and plotting the perimeters of said objects irrespective of the size and orientation of said objects including:
means for sequentially detecting the charge level on adjacent pixels in a substantially straight line of said charge coupled device until said charge level changes from a first level to a second level for a preselected number of consecutive pixels;
means for backing up said detection for said preselected number of pixels and recording the address of the pixel preceeding the pixel where said charge level change occurs as a start pixel address;
means for sequentially detecting the charge level on individual adjacent first and second pixels, the second detection occurring on a second pixel disposed from said first pixel in one direction when the level of said first pixel is said first level and the second detection occurring on a second pixel displaced from said first pixel in an opposite direction when the level of said first pixel is said second level; and
means for storing the address of said second pixel when said second pixel energy level is said first level, and for storing the address of said first pixel when said second pixel energy level is said second level.

2. The subsystem of claim 1 wherein said one direction and said opposite direction are right and left.

3. The subsystem of claim 2 wherein said object is the phosphor screen of a kinescope and said perimeter is defined by black matrix material.

4. The subsystem of claim 1 wherein the address of a pixel adjacent to said start pixel address is recorded as a stop address.

5. The subsystem of claim 4 wherein said stop pixel address is displaced from said start pixel address by one pixel column of said charge coupled device.

6. A method of detecting and plotting the perimeter of an object comprising the steps of:
illuminating a charge coupled device with energy from said object whereby the pixels of said charge coupled device receiving energy from said object are charged to a first level and the pixels of said charge coupled device receiving energy from said perimeter are charged to a second level;
detecting said first level on a pixel inwardly of said perimeter and sequentially detecting said first level on adjacent pixels in a substantially straight line until a preselected number of consecutive pixels having said second level is detected;
returning said detection said preselected number of pixels and recording the address of the last pixel having said first level as a start address;
sequentially detecting the level on adjacent and preceeding pixels by detecting an adjacent pixel in one direction from said preceeding pixel when said first level is detected, and detecting an adjacent pixel in a direction opposite from said one direction when said second level is detected; and
recording said adjacent pixel level as a perimeter pixel when the preceeding pixel is said second level and said adjacent pixel is said first level and recording said preceeding pixel level as a perimeter pixel when said preceeding pixel level is said first level and said adjacent pixel level is said second level.

7. The method of claim 6 wherein said object is the phosphor screen on a kinescope panel and said energy is light passing through said screen.

8. The method of claim 7 wherein said first and second directions are right and left from the direction of detection between said adjacent and preceeding pixels.

9. The method of claim 6 further including the step of recording the address of a pixel adjacent to said last pixel as a stop address.

10. The method of claim 6 further including the steps of:
   incrementing detection one pixel column of said CCD and detecting said first level on a pixel inwardly of said perimeter and sequentially detecting said first level on adjacent pixels in a substantially straight line until a preselected number of consecutive pixels having said second level is detected;
   returning said detection said preselected number of pixels and recording the address of the last pixel having said first level as a stop address.

11. A system for identifying the perimeter of an object comprising:
   a camera including a charge coupled device having a plurality of pixels;
   a central processing unit for receiving image data from said camera;
   means for imaging said object onto said pixels to charge the pixels imaged within the perimeter of said object to a level different from the charge level of pixels imaged outside the perimeter of said object;
   means for sequentially detecting the charge on individual adjacent pixels in a sequence, determined by the detected charge level, whereby detection sequences in one direction for pixels within said perimeter and in another direction for pixels outside said perimeter; and
   means for storing the addresses of the pixels having said charge level within said perimeter and immediately adjacent to pixels having said charge level outside said perimeter.

12. The system of claim 11 wherein said directions of detection are diametrically opposed.

13. The system of claim 11 further including means for sequentially detecting the charge level on adjacent pixels within said perimeter in a substantially straight line of said charge coupled device until said charge level changes to the charge level for pixels outside said perimeter for a preselected number of consecutive pixels; and
   means for backing up said detection for said preselected number of pixels and recording the address of the pixel preceeding the pixel where said charge level change occurs as a start pixel address.

14. The system of claim 13 wherein said directions of detection are diametrically opposed.

* * * * *